W. H. RAY.
CORRUGATED FASTENER DRIVING MACHINE.
APPLICATION FILED MAR. 30, 1908.
1,198,577.
Patented Sept. 19, 1916.
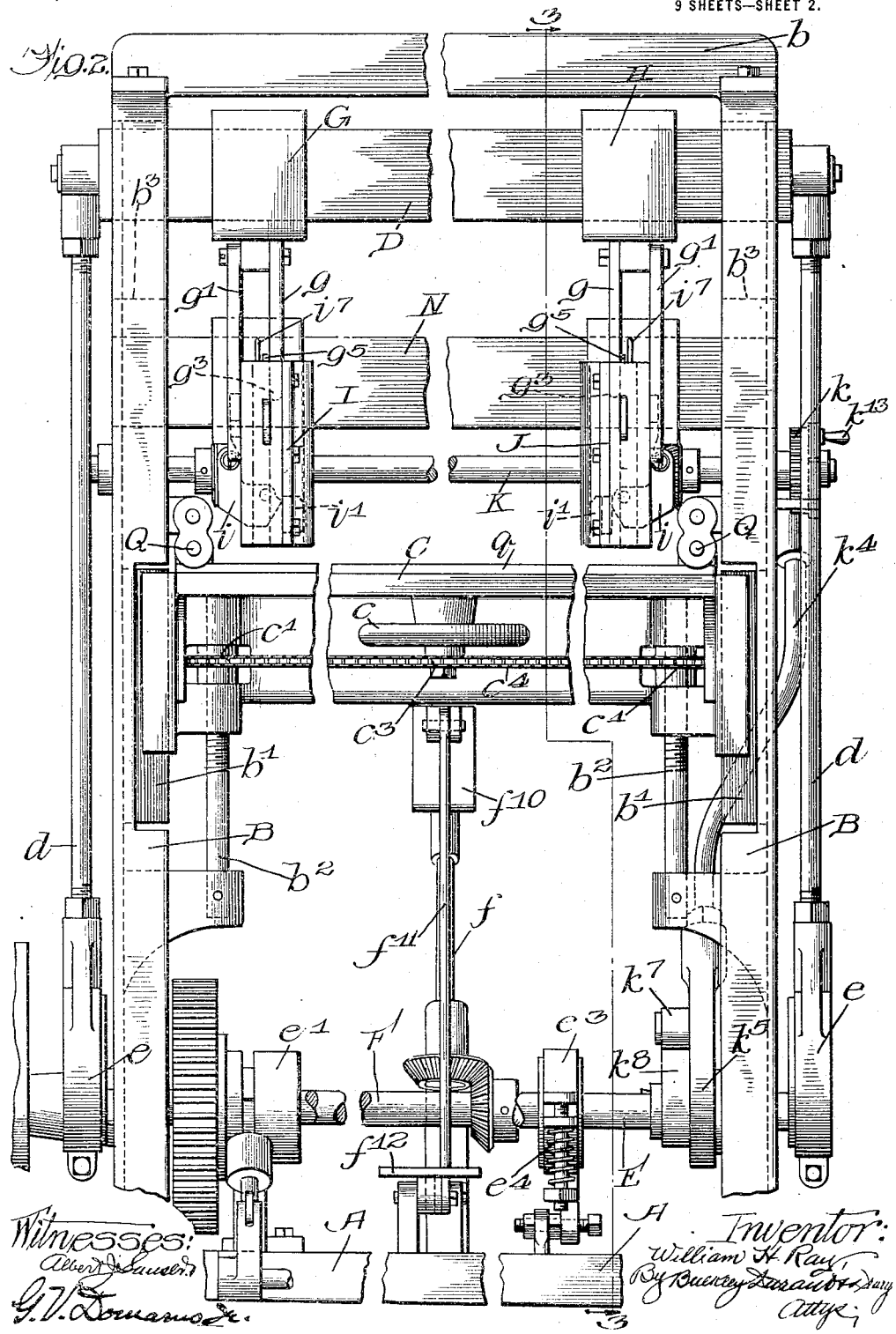

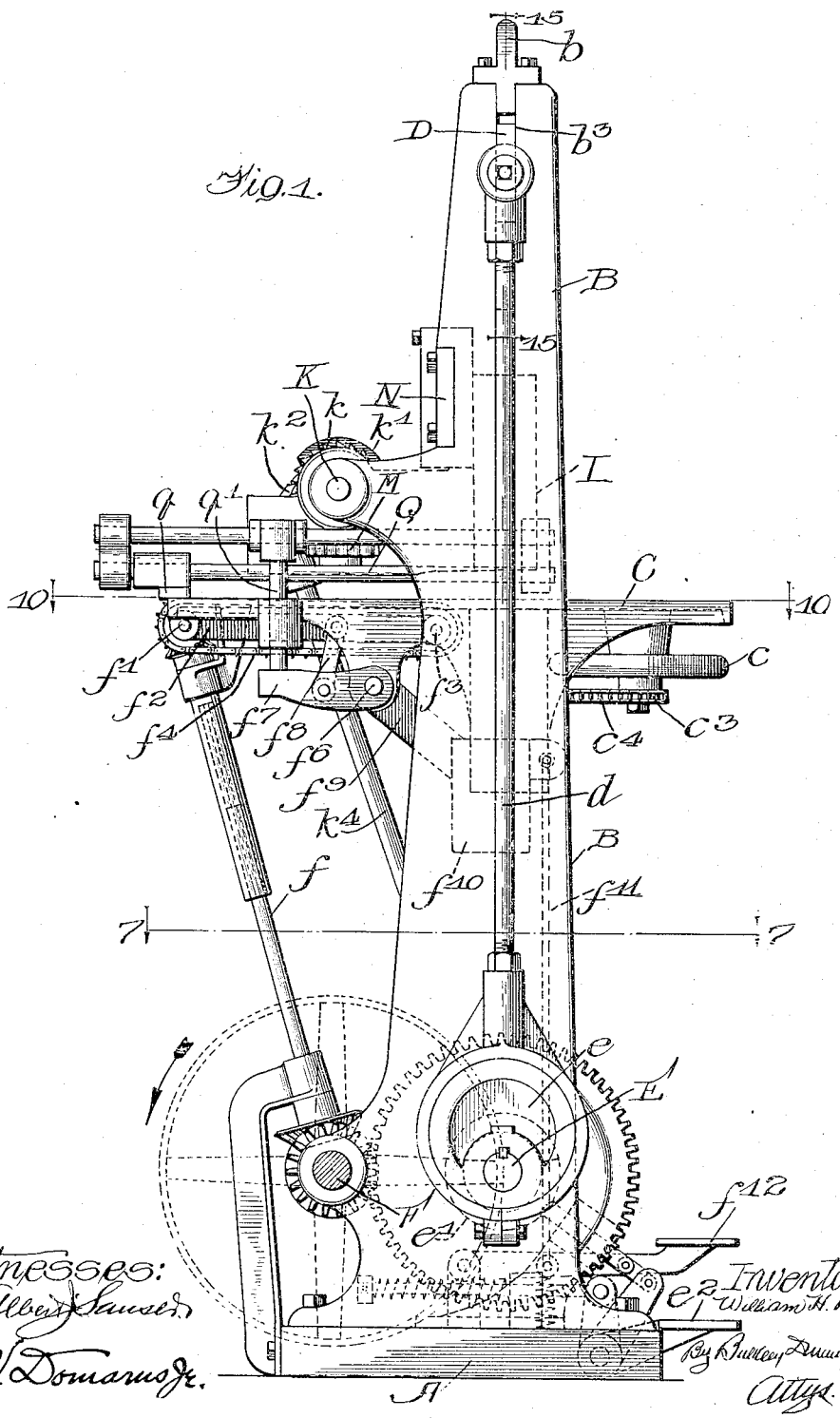

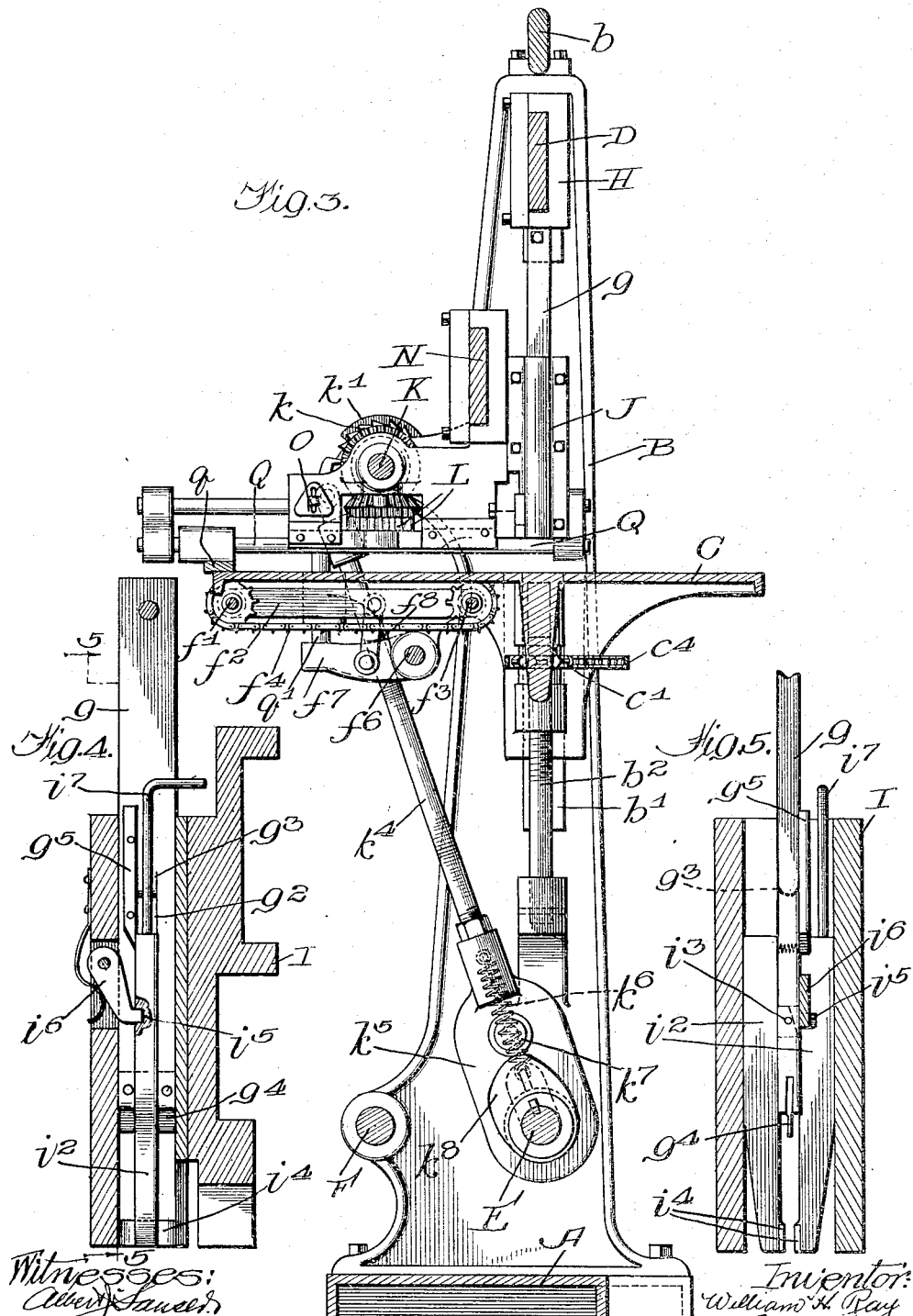

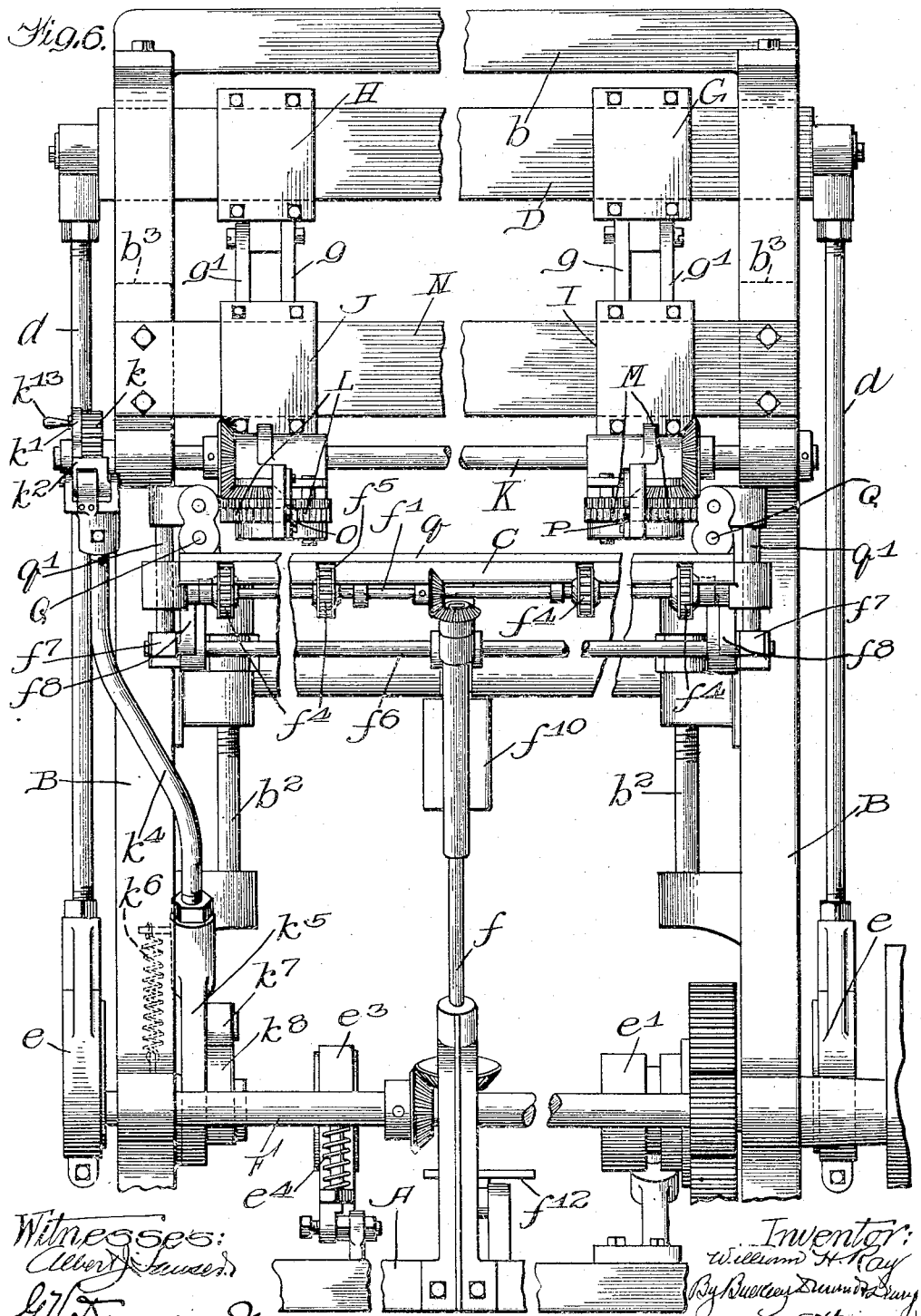

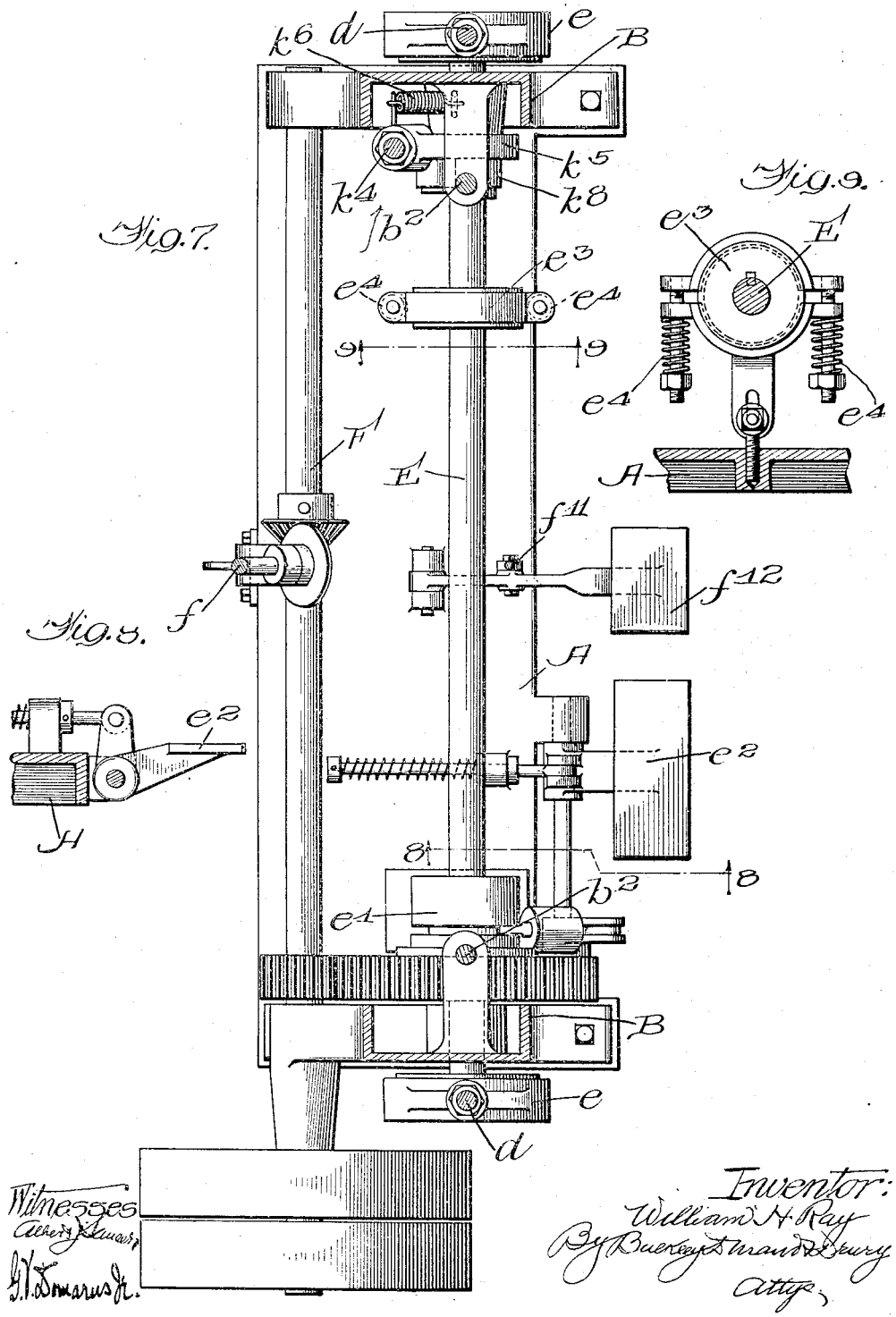

W. H. RAY.
CORRUGATED FASTENER DRIVING MACHINE.
APPLICATION FILED MAR. 30, 1908.
1,198,577.
Patented Sept. 19, 1916.
9 SHEETS—SHEET 6.
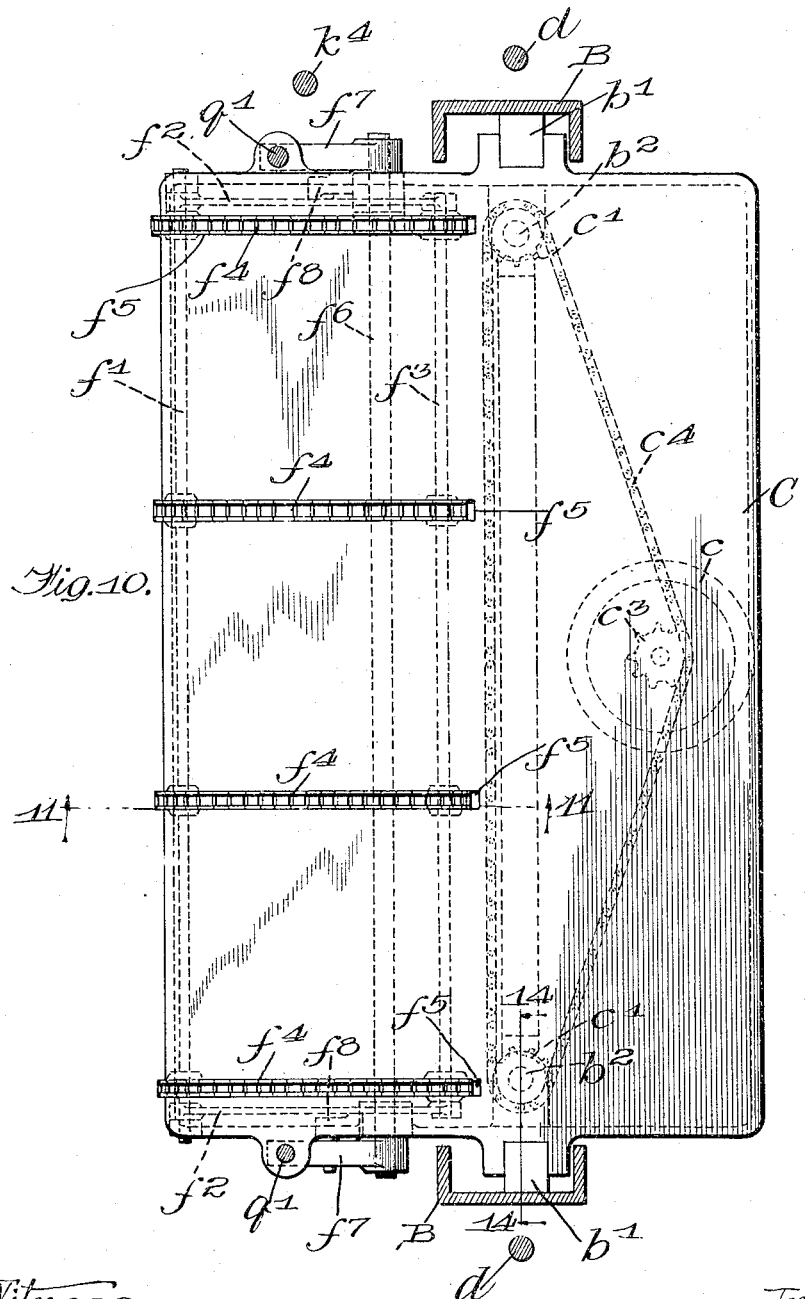

W. H. RAY.
CORRUGATED FASTENER DRIVING MACHINE.
APPLICATION FILED MAR. 30, 1908.
1,198,577.
Patented Sept. 19, 1916.
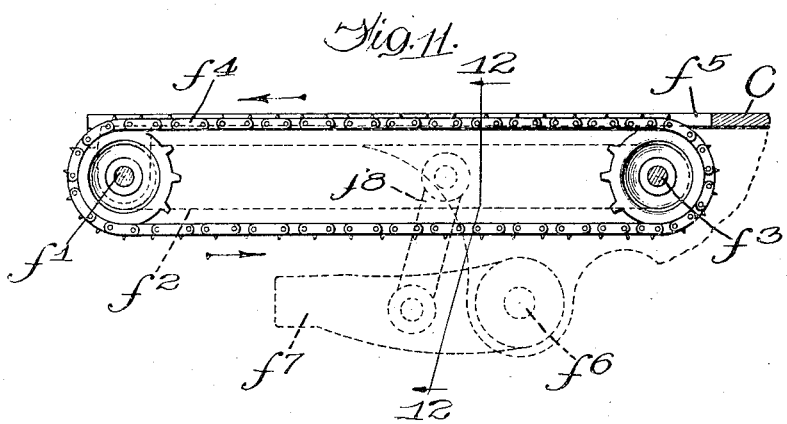
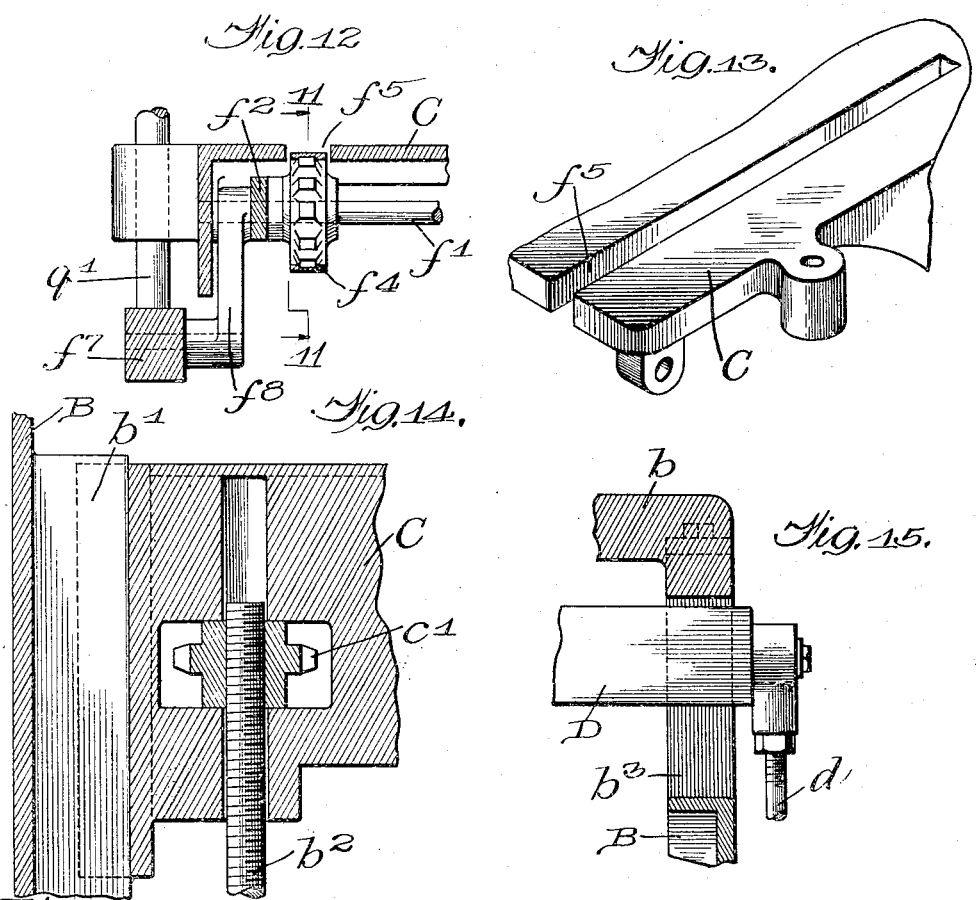

W. H. RAY.
CORRUGATED FASTENER DRIVING MACHINE.
APPLICATION FILED MAR. 30, 1908.
1,198,577.
Patented Sept. 19, 1916.
9 SHEETS—SHEET 8.
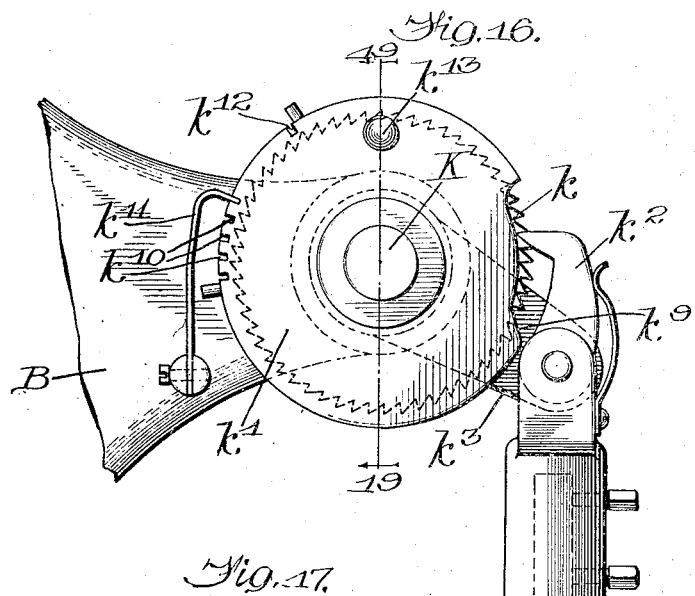
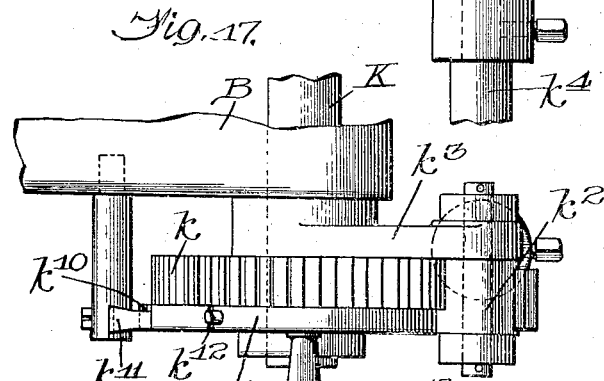
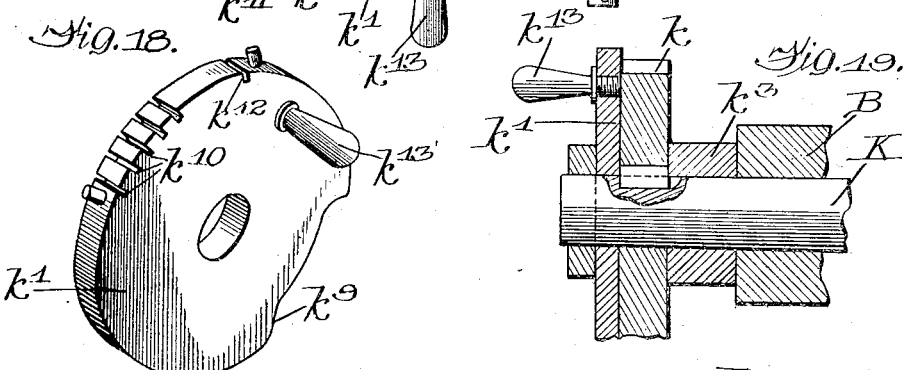

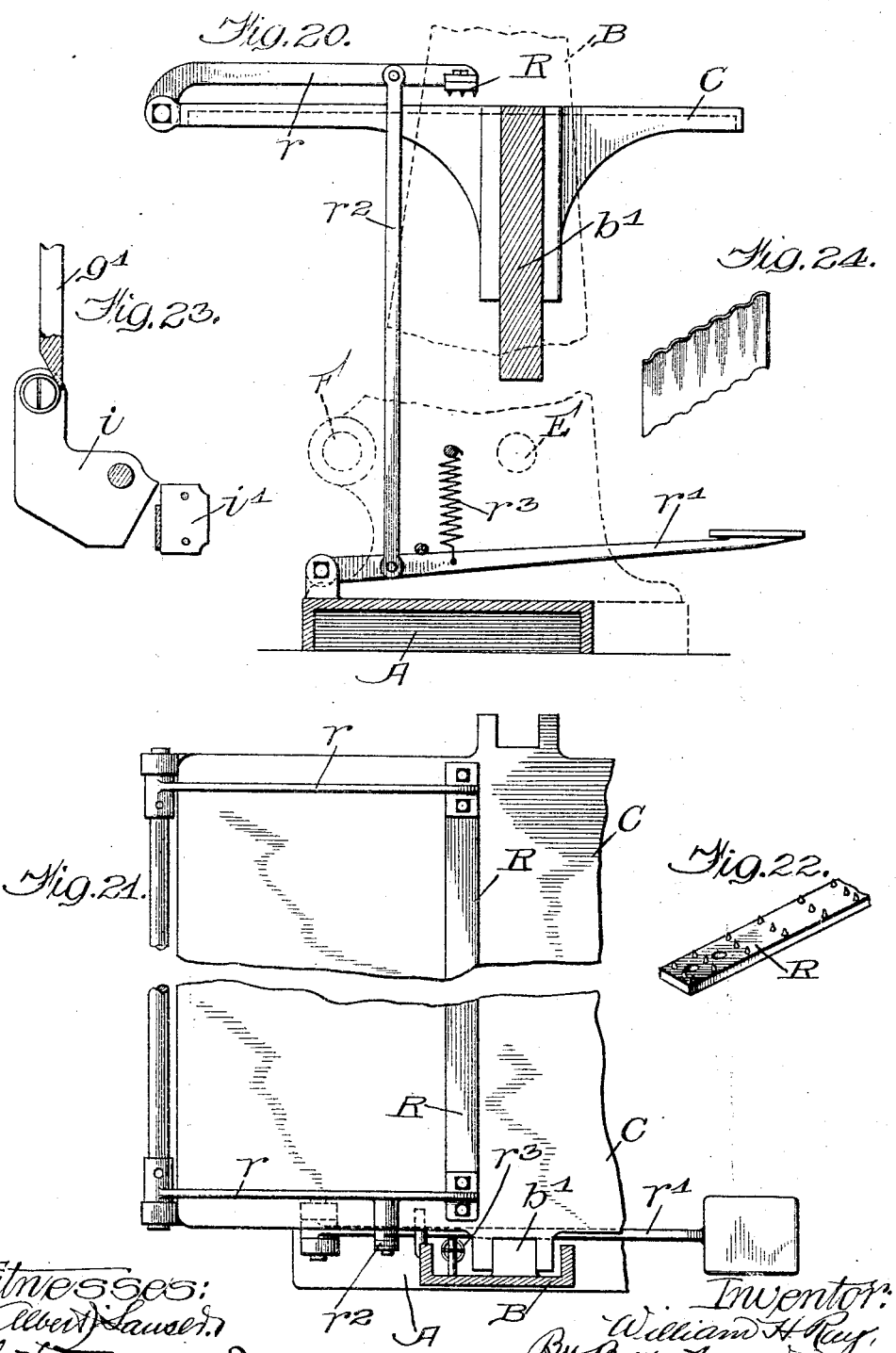

UNITED STATES PATENT OFFICE.

WILLIAM H. RAY, OF ST. JOSEPH, MICHIGAN, ASSIGNOR, BY MESNE ASSIGNMENTS, TO SARANAC MACHINE CO., OF ST. JOSEPH, MICHIGAN, A CORPORATION OF MICHIGAN.

CORRUGATED-FASTENER-DRIVING MACHINE.

1,198,577.  Specification of Letters Patent.  Patented Sept. 19, 1916.

Application filed March 30, 1908. Serial No. 424,094.

*To all whom it may concern:*

Be it known that I, WILLIAM H. RAY, a citizen of the United States of America, and resident of St. Joseph, Berrien county, Michigan, have invented a certain new and useful Improvement in Corrugated-Fastener-Driving Machines, of which the following is a specification.

My invention relates to machines for driving corrugated sheet metal fastening plates, such, for example, as the machines shown in my prior applications Serial Numbers 304,787 and 387,602, the essential feature of a machine of this kind consisting in means for automatically feeding a strip or ribbon of metal—either corrugated or straight, and from which the said fastening plates are made—to a position where suitable lengths thereof are cut off and driven, the corrugating having been done either before or after the strip or ribbon is placed on the machine, and either before or after the plates are cut off, so far as the broad idea is concerned.

The object of my present invention is the provision of a construction whereby a plurality of said plates can be cut off and driven simultaneously.

My invention also contemplates, as will hereinafter more fully appear, certain details and features of improvement and novel combinations, some of which are also adapted for use in other kinds of machinery—that is to say, in machines other than those for driving corrugated sheet metal fastening plates.

To the foregoing and other useful ends, my invention consists in matters hereinafter set forth and claimed.

In the accompanying drawings, Figure 1 is a side elevation of a corrugated metal fastener driving machine embodying the principles of my invention. Fig. 2 is a front elevation of the same, showing a portion thereof broken away for convenience of illustration. Fig. 3 is a vertical section on line 3—3 in Fig. 2. Fig. 4 is an enlarged detail sectional view of one of the drivers. Fig. 5 is a vertical section on line 5—5 in Fig. 4. Fig. 6 is a rear elevation of said machine, broken away at the center thereof for convenience of illustration. Fig. 7 is a horizontal plan view on line 7—7 in Fig. 1. Fig. 8 is a detail section on line 8—8 in Fig. 7. Fig. 9 is a detail section on line 9—9 in Fig. 7. Fig. 10 is a horizontal section on line 10—10 in Fig. 1. Fig. 11 is an enlarged vertical section on line 11—11 in Fig. 10, and in Fig. 12. Fig. 12 is a detail section on line 12—12 in Fig. 11. Fig. 13 is a perspective of one of the slotted portions of the table. Fig. 14 is an enlarged detail section on line 14—14 in Fig. 10. Fig. 15 is a detail sectional view on line 15—15 in Fig. 1. Fig. 16 is an enlarged detail side elevation of one of the feed-devices for feeding the strip or ribbon of steel. Fig. 17 is a plan of the device shown in Fig. 16. Fig. 18 is a perspective of the adjustable disk or wheel for changing the feed and thereby varying the length of the fasteners. Fig. 19 is a section on line 19—19 in Fig. 16. Fig. 20 is a detail sectional view, illustrating a modification of the means for holding the work in place during the operation of driving the fasteners. Fig. 21 is a plan of the devices shown in Fig. 20, broken away at the center for convenience of illustration. Fig. 22 is a perspective of the spiked shoe or clamp involved in the construction shown in Figs. 20 and 21. Fig. 23 is a detail sectional view of one of the cutting or shearing devices. Fig. 24 is a perspective of one of the corrugated sheet metal fasteners or fastening plates.

As thus illustrated, it will be seen that my invention comprises a base A, upon which are supported the two uprights or side members B, which latter are rigidly connected at their upper ends by a cross bar $b$. The said uprights are provided on the inner side thereof with guides $b'$ for the table C, which latter is adapted to support the work, and to be raised and lowered by a hand wheel $c$ carried thereon. The frame is also provided with means for supporting the two vertical screws or threaded posts $b^2$, which latter are provided with sprocket wheels $c'$ adapted to act as adjusting nuts, said sprocket wheels being disposed in recesses in the structure of the said table. The third sprocket wheel $c^3$ is mounted to be rotated by the hand wheel $c$, and all of said sprocket wheels are connected by a sprocket chain $c^4$, whereby rotation of said hand wheel serves to raise and lower the table. A cross head D slides up and down in guideways $b^3$ formed in the upper portions of the sides B, and is actuated by a pitman $d$ connected with the outer ends thereof. A counter-shaft E is provided at its outer ends with eccentrics $e$ by which the said pitman $d$ is operated, thus causing the cross head to have a vertically reciprocating motion. A drive shaft F, arranged at the base of the machine, is gear-connected with said counter-shaft, and the said counter-shaft has a clutch $e'$ controlled by a foot lever $e^2$, whereby the motion of the cross head can be controlled by the operator. A friction brake $e^3$ is applied to the said counter-shaft, in any suitable manner, as by springs $e^4$, whereby the machine runs with sufficient friction to prevent it from operating beyond the point where it is required to stop— that is to say, it will not tend to operate by momentum after the power is disconnected. The said drive shaft has a beveled gear connection with the vertically disposed shaft $f$, which latter has a bevel gear connection at its upper end with the horizontal sprocket wheel shaft $f'$. The frame $f^2$ is pivoted to swing about an axis coincident with the shaft $f'$, and at its other end carries a shaft $f^3$, which latter is also provided with sprocket wheels. Sprocket chains $f^4$ are arranged over the said sprockets, whereby the power transmitted through the drive shaft, through the shaft $f$, is communicated from the shaft $f'$ to the shaft $f^3$, which latter, however, is merely an idler. These sprocket chains are preferably provided with small teeth or projections, and the said chains run normally just below the top of the table, and within slots $f^5$ in said table. The table carries a rock shaft $f^6$ having an arm $f^7$ connected by a link $f^8$ with the said frame $f^2$. The said rock shaft has another arm $f^9$, that carries a weight $f^{10}$, which latter is connected by a rod $f^{11}$ with a foot lever $f^{12}$. With this arrangement, a depression of the said foot lever serves to raise all of the sprocket chains $f^4$, by raising the frame $f^2$, thus bringing the said sprocket chains in engagement with the bottom of the work. When this takes place, the motion of the chains is such that the work is immediately thrown off the table—that is to say, it is discharged from the rear of the table, and away from the operator standing in position to use and control the said foot levers and hand wheel. At this juncture, it will be understood, of course, that the shaft $f$ and the rod $f^{11}$ are preferably jointed in such manner as to permit them to subserve their functions without interfering with the adjustment or up and down movements of the table.

As shown, the cross head is provided with two driving heads G and H, although the machine is not limited to this number, as any suitable number of driving heads can be employed. Except that one is right and the other left, the two driving and forming heads are exactly alike, so that a description of the head G and the forming and cutting head I will be sufficient, it being understood that the driving head H coöperates with another cutting and forming head J. The head G is provided with a driver $g$ and a vertically reciprocating cam finger $g'$, which latter actuates the pivoted knife $i$, (see Fig. 23). The said pivoted knife coöperates with a stationary knife $i'$ to cut off a length of the strip or ribbon of steel or other suitable metal. The said driver $g$ is shown in Figs. 4 and 5, and is provided with a longitudinal slot $g^2$ having a cam portion or wedge $g^3$ at the upper end thereof. The said driver is also provided with a thin plate or engaging portion $g^4$ at the lower end thereof, which latter is adapted to engage the upper edge of the fastener to drive the same.

The two clamping fingers $i^2$ are pivotally connected together at $i^3$, at a point within the said slot of the driver, and are adapted to have a slight opening and closing movement at their lower ends $i^4$, whereby the fastener may be gripped and securely held while being cut off, and while being driven. The closing movement of the fingers is produced by the wedge or cam $g^3$ when it engages between the upper ends of the fingers, thus crowding the same apart and causing the lower ends thereof to come together. One of said fingers is provided with a small opening or recess $i^5$ adapted to engage the end of a spring pressed latch $i^6$, which latter is pivoted on the head or casing I and within a slot therein. By this latch the upward movement of the fingers is limited, and their downward movement is limited by a wire finger $i^7$ which engages the top of the head or casing I with its laterally bent upper end when the fingers and driver move downwardly. The said driver carries a cam or wedge $g^5$ for operating the said latch, the mechanism being timed to release the latch just after the fastener is cut off by the two knives. The strip or ribbon of metal is fed through guide openings in the said head or casing I, and in such manner as to bring the end portion thereof between the gripping portions $i^4$ of the fingers, and in correct position to be driven as soon as it is cut off. Thus the driving takes place in the same vertical plane in which the strip of metal is fed and cut off, the gripping portions $i^4$ securely holding the corrugated fastener until it is cut off and during the time that the same is being driven. At the back of the machine, and supported in bearings on the frame, there is a feed shaft K. This shaft is provided at its outer end with a ratchet wheel $k$, and has a rotatable disk or wheel $k'$ loosely mounted thereon. The feed pawl $k^2$ is carried on the end of a swinging arm $k^3$, which latter is loose on the shaft K. A pitman $k^4$ connects the feed pawl and arm with a yoke $k^5$ mounted to slide on the counter-shaft E. A spring $k^6$ tends normally to draw the said pitman downwardly, and the said yoke is provided with a roller or projection $k^7$ adapted to be engaged by a cam $k^8$, which is fixed to the said counter-shaft. Thus the rotation of the counter-shaft gives the pitman $k^4$ a reciprocating motion, which in turn causes the pawl $k^2$ to rotate the ratchet wheel on the shaft K. The extent of rotation thus given the feed shaft K is regulated by the disk or wheel $k'$, as upon the back stroke thereof the pawl $k^2$ is thrown out of engagement with the ratchet wheel by the cam $k^9$, with which the said disk or wheel is provided on the periphery thereof. The said disk or wheel is provided at its other side with peripheral notches $k^{10}$ adapted to be engaged by a spring $k^{11}$, which latter is secured to the frame of the machine. By causing this spring to engage different ones of the said notches, the position of the cam $k^9$ will be changed or varied, and thus the effective stroke of the ratchet will be changed or varied, the stroke being relatively long or short, depending upon which notch the spring is caused to engage. If the feeding motion is required to be stopped entirely, then the spring can be placed in the notch $k^{12}$, thereby causing the pawl $k^2$ to ride entirely upon the periphery of the disk or wheel and entirely out of engagement with the ratchet wheel. A handle $k^{13}$ on the said disk or wheel enables the operator to adjust the same for the purpose of changing the throw of the ratchet, and thereby varying the feed. The said feed shaft is gear-connected with the feed rolls L and M at the back of the machine, said feed rolls being mounted to rotate about vertical axes, and being carried by the stationary heads I and J, which latter are carried by the cross bar N mounted on the frame of the machine. It will be seen, therefore, that a set of feed rolls, two in number, is provided for each driving head, and that one member of each set is gear-connected with the feed shaft, in the manner shown more clearly in Fig. 6. The guides O and P serve to direct the thin strips or ribbons of metal to their respective feed rolls, and thus the metal is fed horizontally to the cutting and driving mechanisms, each strip of metal being held and fed with its upper and lower edges in a vertical plane, so that each fastener is in a position to be driven as soon as it is cut off. The finished fastener, as shown in Fig. 24, is in the nature of a rectangular fastening plate having transverse corrugations, which corrugations are inserted endwise in the wood or other suitable material. In other words, the fastener is so driven that its lower edge enters the wood first, cuts its way through the material, and the corrugations are thus caused to move in the direction of their length in order to bring the fastener fully within the wood or other material.

The frame of the machine, at a point just above the table, is provided at each side thereof with suitably supported and horizontally extending rods Q, upon which is adjustably mounted the back stop or abutment $q$, which latter is adapted to be engaged by the rear edges of the boards or other work to limit their insertion in the machine. This back stop or abutment can be adjusted along the said rods, and thus the work can be properly positioned within the machine, some kinds of work requiring a greater extent of insertion in the machine than others. The rods Q are supported on standards $q'$, which latter rest at their lower ends on the arms $f^7$, whereby the stop $q$ is raised when the chains are raised, thus allowing the work to escape below the said stop.

Means can also be provided for holding the work down and in place during the driving of the fasteners, such as shown in Figs. 20, 21 and 22. As thus illustrated, the said means comprises a spiked shoe or clamping jaw R, which is secured to swinging arms $r$, pivotally mounted at the rear edge of the table. An additional foot lever $r'$ can be provided at the base of the machine, and the same can be connected by a rod $r^2$ with one of the arms $r$, whereby the downward movement of said foot lever causes the shoe or clamping jaw R to firmly bear upon the top of the work. In this way several supports or pieces can be inserted in the machine, and held tightly together and in place while being fastened together by the driving of the fasteners. A spring $r^3$ may be applied to said foot lever for the purpose of holding the same and the jaw R in normally elevated positions.

From the foregoing, it will be seen that I provide a multiple head machine for driving corrugated sheet metal fasteners of such character that the fasteners are formed, cut off and driven simultaneously, each in a direction to cause the corrugations thereof to enter the wood or other material in the direction of their length. In this way any suitable number of fasteners can be driven by a single stroke of the cross head, and the fastening together of boards or other articles is facilitated and rendered more certain, and accomplished in less time than heretofore. It will also be seen that I provide a simple and efficient arrangement for throwing the work off the table after the same has been operated upon, as well as for raising and lowering the table for different thicknesses of work. The variation of the feed, to enable the machine to drive fasteners of different lengths—that is to say, fasteners having a greater or less number of corrugations—is accomplished by simple and efficient means, in the manner described.

I do not limit myself to the exact construction shown and described.

What I claim as my invention is:-

1. A machine for driving corrugated sheet metal fasteners, comprising a driver, a pair of fingers for holding the fasteners, a latch for holding the fingers in position, means on the driver for actuating the fingers to grip the fasteners, means on the driver for operating the latch to release the fingers, and means for limiting the movement of the fingers with the driver.

2. A machine for driving corrugated sheet metal fasteners, comprising a driver, a pair of fingers for holding the fasteners, a latch for holding the fingers in position, means on the driver for actuating the fingers to grip the fasteners, means on the driver for operating the latch to release the fingers, and means for limiting the movement of the fingers with the driver, said fingers being pivoted together, and said driver having a slot for accommodating said pivot.

3. A machine for driving corrugated sheet metal fasteners, comprising a driver, a pair of fingers for holding the fasteners, a latch for holding the fingers in position, means on the driver for actuating the fingers to grip the fasteners, means on the driver for operating the latch to release the fingers, and means for limiting the movement of the fingers with the driver, one of said fingers having an opening for the end of said latch, a stationary support upon which said latch is pivoted, and a spring secured to said support to yieldingly hold said latch in said opening.

4. A machine for driving corrugated sheet metal fasteners, comprising a driver, a pair of fingers for holding the fasteners, a latch for holding the fingers in position, means on the driver for actuating the fingers to grip the fasteners, means on the driver for operating the latch to release the fingers, and means for limiting the movement of the fingers with the driver, said driver being disposed between said fingers, and a connection between said fingers.

5. A machine for driving corrugated sheet metal fasteners, comprising a driver, a pair of fingers for holding the fasteners, a latch for holding the fingers in position, means on the driver for actuating the fingers to grip the fasteners, means on the driver for operating the latch to release the fingers, and means for limiting the movement of the fingers with the driver, means for feeding a strip between said fingers, and means for cutting off the end portion of said strip while the same is held by said fingers.

6. A machine for driving corrugated sheet metal fasteners, comprising a driver, a pair of fingers for holding the fasteners, a latch for holding the fingers in position, means on the driver for actuating the fingers to grip the fasteners, means on the driver for operating the latch to release the fingers, and means for limiting the movement of the fingers with the driver, a member rigid with said driver, means for reciprocating said driver and member, means for feeding a strip between said fingers, and strip cutting means operated by said member.

7. A machine for driving corrugated sheet metal fasteners, comprising a driver, a pair of fingers for holding the fasteners, a latch for holding the fingers in position, means on the driver for actuating the fingers to grip the fasteners, means on the driver for operating the latch to release the fingers, and means for limiting the movement of the fingers with the driver, means for reciprocating said driver and fingers up and down, and means for supplying the fasteners to said fingers, said latch limiting the upward movement of said fingers.

8. A machine for driving corrugated sheet metal fasteners, comprising a driver, a pair of fingers for holding the fasteners, a latch for holding the fingers in position, means on the driver for actuating the fingers to grip the fasteners, means on the driver for operating the latch to release the fingers, and means for limiting the movement of the fingers with the driver, means for feeding a strip between said fingers, means for cutting off the end portion of the said strip while the same is held by said fingers, and means for varying the degree of insertion of said strip between the fingers.

9. A machine for driving corrugated sheet metal fasteners, comprising a reciprocating head, mechanism independent of said head to feed a strip of metal, means operated by said head to cut off the end portion of said strip, and a driver operated by said head to insert the fastener edgewise, said means including a pivoted knife, a cam rigid with said head, and means on said knife to engage said cam.

10. A machine for driving corrugated sheet metal fasteners, comprising a reciprocating head, mechanism independent of said head to feed a strip of metal, means operated by said head to cut off the end portion of said strip, and a driver operated by said head to insert the fastener edgewise, a shaft connected to operate said head, and a cam on said shaft to operate said mechanism.

11. A machine for driving corrugated sheet metal fasteners, comprising a reciprocating head, mechanism independent of said head to feed a strip of metal, means operated by said head to cut off the end portion of said strip, and a driver operated by said head to insert the fastener edgewise, and supporting means having flat opposing faces to engage the opposite surfaces of the sheet metal fasteners.

12. A machine for driving corrugated sheet metal fasteners, comprising a reciprocating head, mechanism independent of said head to feed a strip of metal, means operated by said head to cut off the end portion of said strip, and a driver operated by said head to insert the fastener edgewise, said mechanism including a horizontal shaft, and feed rolls geared to said shaft, said rolls having vertical axes of rotation.

13. A machine for driving corrugated sheet metal fasteners, comprising a reciprocating head, means for feeding a strip of metal, a strip cutting device operated by said head, a driver rigid with said head, and means for engaging the opposite surfaces of the sheet metal to support said fastener in driving position, said device including a pivoted knife, a depending member rigidly secured at its upper end on said head to operate said knife, and means on said knife to engage said member.

14. A machine for driving corrugated sheet metal fasteners, comprising a reciprocating head, mechanism for feeding a strip of metal, a strip cutting device operated by said head, a driver rigid with said head, and means for engaging the opposite surfaces of the sheet metal to support said fastener in driving position, said mechanism including corrugated rolls rotating about vertical axes to feed the strip in corrugated condition to said means.

Signed by me at St. Joseph, Michigan, this 11th day of March, 1908.

WILLIAM H. RAY.

Witnesses:
CHAS. W. STRATTON,
HELEN C. CLARKE.

Copies of this patent may be obtained for five cents each, by addressing the "Commissioner of Patents, Washington, D. C."